United States Patent
Yi

(10) Patent No.: US 12,283,888 B2
(45) Date of Patent: Apr. 22, 2025

(54) UNDERVOLTAGE PROTECTION CIRCUIT FOR A DC/DC CONVERTER AND METHOD THEREOF

(71) Applicant: VALEO EQUIPEMENTS ELECTRIQUES MOTEUR, Creteil (FR)

(72) Inventor: Zhenhua Yi, Shanghai (CN)

(73) Assignee: VALEO EQUIPEMENTS ELECTRIQUES MOTEUR, Creteil (FR)

(*) Notice: Subject to any disclaimer, the term of this patent is extended or adjusted under 35 U.S.C. 154(b) by 191 days.

(21) Appl. No.: 17/907,627

(22) PCT Filed: Mar. 31, 2021

(86) PCT No.: PCT/CN2021/084466
§ 371 (c)(1),
(2) Date: Sep. 28, 2022

(87) PCT Pub. No.: WO2021/197380
PCT Pub. Date: Oct. 7, 2021

(65) Prior Publication Data
US 2023/0132537 A1 May 4, 2023

(30) Foreign Application Priority Data
Mar. 31, 2020 (CN) .......................... 202010246949.5

(51) Int. Cl.
*H02M 3/158* (2006.01)
*H02H 7/12* (2006.01)
(Continued)

(52) U.S. Cl.
CPC .......... *H02M 3/158* (2013.01); *H02H 7/1213* (2013.01); *H02M 1/32* (2013.01); *H02M 1/36* (2013.01)

(58) Field of Classification Search
CPC .......... H02M 1/36; H02M 1/32; H02H 3/247; H02H 3/207; H02H 3/24
See application file for complete search history.

(56) References Cited

U.S. PATENT DOCUMENTS 10,312,816 B1 * 6/2019 Zhao ...................... H02M 3/156
11,277,068 B2 * 3/2022 Radic ...................... H02M 1/36
(Continued)

FOREIGN PATENT DOCUMENTS

EP           2 897 270 A1    7/2015
WO      WO 2019/225394 A1   11/2019

OTHER PUBLICATIONS

International Search Report mailed on Jun. 21, 2021 in PCT/CN2021/084466 filed on Mar. 31, 2021 (4 pages).
(Continued)

*Primary Examiner* — Gustavo A Rosario-Benitez
(74) *Attorney, Agent, or Firm* — Oblon, McClelland, Maier & Neustadt, L.L.P.

(57) ABSTRACT

The present disclosure relates to an undervoltage protection circuit for a DC/DC converter of an electrified vehicle. The DC/DC converter generally operates in a first precharge stage, a second precharge stage and a buck mode. The undervoltage protection circuit comprises a threshold value switching unit which is connected with a controller and configured for receiving a control signal from the controller and switching among at least two predetermined undervoltage protection threshold values based on the control signal as received. The undervoltage protection circuit also comprises an undervoltage protection unit configured for outputting a signal indicating whether to activate an undervoltage protection based on a comparison between the switched undervoltage protection threshold value and a sampled voltage value from a high voltage side of the DC/DC converter. In the circumstance that the DC/DC converter operates in the buck mode, the undervoltage protection unit will activate the undervoltage protection such as to prevent a large current flowing from a low side voltage side to the high voltage side if the sampled voltage value is less than or equal to the switched undervoltage protection threshold value, and the DC/DC converter will continuously operate in the buck mode if the sampled voltage value is greater than the switched undervoltage protection threshold value. The present disclosure also relates to a method of undervoltage protection for a DC/DC converter of an electrified vehicle.

13 Claims, 6 Drawing Sheets

(51) Int. Cl.
*H02M 1/32* (2007.01)
*H02M 1/36* (2007.01)

(56) References Cited

U.S. PATENT DOCUMENTS

| | | | |
|---|---|---|---|
| 2005/0001601 A1* | 1/2005 | Adragna | H02M 1/36 323/282 |
| 2007/0263419 A1* | 11/2007 | Sasaki | H02M 1/36 363/49 |
| 2009/0040793 A1* | 2/2009 | Huynh | H02M 1/36 363/21.12 |
| 2009/0108827 A1* | 4/2009 | Sasaki | H02M 1/36 323/299 |
| 2009/0303641 A1 | 12/2009 | Abe | |
| 2011/0279101 A1 | 11/2011 | Sasaki et al. | |
| 2015/0207401 A1 | 7/2015 | Zhang et al. | |
| 2016/0033560 A1* | 2/2016 | Thanner | G01R 19/16552 324/764.01 |
| 2016/0141951 A1* | 5/2016 | Mao | H02M 1/36 363/21.02 |
| 2020/0127555 A1* | 4/2020 | Matsuda | H02M 3/33523 |
| 2020/0389087 A1* | 12/2020 | Hiasa | H02M 1/36 |

OTHER PUBLICATIONS

Office Action issued Aug. 29, 2024, in corresponding European Patent Application No. 21 719 037.0, citing document 1 therein, 8 pages.

\* cited by examiner

UNDERVOLTAGE PROTECTION CIRCUIT FOR A DC/DC CONVERTER AND METHOD THEREOF

TECHNICAL FIELD

Embodiments of the present disclosure generally relate to an undervoltage protection circuit for a DC/DC converter and method thereof.

BACKGROUND

In the field of electrified vehicle, it is well known that 48V to 12V DC-DC (Direct Current to Direct Current, "DC/DC") converter is used in a dual power network automotive architecture so as to control the power exchanges between a traditional 12V network (i.e., Low Voltage side, "LV side") and a 48 V network (i.e., High Voltage side, "HV side"). Specifically, HV side of a DC/DC converter is connected with an iBSG (i.e., integrated Belt Starter Generator) and with a 48V battery by a relay as well in an electrified vehicle. Capacitors in the HV side need to be charged to 48V battery voltage through the precharge mechanism of a DC/DC converter, then the vehicle switches on the relay to connect the 48V battery to the HV side so that the 48V battery provides power to the iBSG. The engine is ignited when the iBSG operates in a starter mode, iBSG will be driven to operate in a generator mode afterwards, then the vehicle commands the DC/DC converter to run in a Buck mode to realize the power exchange. Referring to FIG. 1, pre-charge of a DC/DC converter can be divided into two stages. HV side capacitors are charged to a LV side voltage value in a first pre-charge stage and charged to a target voltage value, i.e., a HV side voltage value in a second pre-charge stage. There might be voltage dip on HV side for some reasons, such as HV-to-Ground short circuit, engine ignition, etc., it is necessary to add the mechanism of HV side Under-Voltage Protection ("UVP") to the DC/DC converter. Normally, there is only one threshold for the mechanism of HV side UVP, and this threshold, e.g., 5.5V, is lower than the initial voltage of the second pre-charge stage. Still referring to FIG. 1, in the first pre-charge stage, the main power circuit does not work, HV side capacitors are charged by a constant-current source circuit, and HV side voltage is increased from 0V to a voltage of 12V battery. During the first pre-charge stage, The UVP is actually a timeout protection, i.e., a timeout fault will be reported and the first pre-charge stage will be suspected if the time of under-voltage status is obviously longer than the time of the first pre-charge stage. In the second pre-charge stage, the main power circuit operates in a low-power Boost mode, HV side capacitors are charged from 12V battery voltage to the target voltage. UVP will be triggered immediately on condition that HV side voltage drops below the threshold, DC/DC converter will stop the second pre-charge stage and switch off safety MOSFET (Metal-Oxide-Semiconductor Field Effect Transistors). When DC/DC converter operates in a high-power Buck mode, UVP will be trigged immediately on condition that HV side voltage value drops below the threshold, DC/DC converter will stop the Buck mode and switch off safety MOSFET. Otherwise, when DC/DC converter operates in high-power Buck mode, if HVside voltage value drops to a voltage lower than that of 12V battery but still higher than the threshold, UVP will not be trigged and the safety MOSFET is still switch-on, it is noted that an uncontrolled and large current will flow from LV side to HV side and flow through safety MOSFET, referring to FIG. 2, this current may damage safety MOSFET and Buck MOSFET. If we raise the threshold to the value higher than 12V battery voltage so as to solve the above problem, UVP will be triggered in an early stage of the second pre-charge stage, which cause a new problem, i.e., the second pre-charge stage cannot be accomplished.

Therefore, it would be desirable if an improved UPV mechanism could be provided for a 48V to 12V DC/DC converter of an electrified vehicle at least with high efficient, high reliability and simple configuration.

SUMMARY OF THE INVENTION

In accordance with one embodiment disclosed herein, an undervoltage protection circuit for a DC/DC converter of an electrified vehicle is provided. The DC/DC converter generally operates in a first precharge stage, a second precharge stage and a buck mode. The undervoltage protection circuit comprises a threshold value switching unit which is connected with a controller and configured for receiving a control signal from the controller and switching among at least two predetermined undervoltage protection threshold values based on the control signal as received. The undervoltage protection circuit also comprises an undervoltage protection unit configured for outputting a signal indicating whether to activate an undervoltage protection based on a comparison between the switched undervoltage protection threshold value and a sampled voltage value from a high voltage side of the DC/DC converter. In the circumstance that the DC/DC converter operates in the buck mode, the undervoltage protection unit will activate the undervoltage protection such as to prevent a large current flowing from a low side voltage side to the high voltage side if the sampled voltage value is less than or equal to the switched undervoltage protection threshold value, and the DC/DC converter will continuously operate in the buck mode if the sampled voltage value is greater than the switched undervoltage protection threshold value.

In one embodiment, in the circumstance that the DC/DC converter operates in the first precharge stage, the signal indicating the undervoltage status as outputted by the undervoltage protection circuit will be used as a start signal for a timeout fault timer to start timing.

In one embodiment, in the circumstance that the DC/DC converter operates in the second precharge stage, the undervoltage protection unit will activate the undervoltage protection if the sampled voltage value is less than or equal to the switched undervoltage protection threshold value, and the DC/DC converter will continuously operate in the second precharge stage if the sampled voltage value is greater than the switched undervoltage protection threshold value.

In one embodiment, the at least two predetermined undervoltage protection threshold values are respectively provided with the first precharge stage, the second precharge stage and/or the buck model, the second precharge stage or the buck model will be suspended when activating an undervoltage protection.

In one embodiment, the at least two predetermined undervoltage protection threshold values comprise: a first undervoltage protection threshold value for the first and second precharge stages; and a second undervoltage protection threshold value for the buck model; when the DC/DC converter operated in the first and second precharge stages, the first undervoltage protection threshold value will be switched by the threshold value switching unit; when the DC/DC converter operated in the buck model, the second undervoltage protection threshold value will be switched by the threshold value switching unit.

In one embodiment, the threshold value switching unit comprises an electric switch, the first undervoltage protection threshold value for the first and second precharge stages will be generated when the electric switch is turned on, the second undervoltage protection threshold value for the buck model will be generated when the electric switch is turned off.

In one embodiment, the control signal received by the threshold value switching unit from the controller comprises the signal at a high level and the signal low level, the electric switch will be turned off when the control signal is at a low level, the electric switch will be turned on when the control signal is at a high level.

In one embodiment, the undervoltage protection unit comprises a comparing device configured for receiving and comparing the sampled voltage value from a high voltage side and the switched undervoltage protection threshold value, and for outputting the signal at a high or low level based on the result of the comparing so as to indicate whether to activate the undervoltage protection, it will be indicated to activate the undervoltage protection when outputting the signal at a low level.

In accordance with another embodiment disclosed herein, a method of undervoltage protection for a DC/DC converter of an electrified vehicle is provided. The DC/DC converter generally operates in a first precharge stage, a second precharge stage and a buck mode. The method of undervoltage protection comprises receiving a control signal from the controller and switching among at least two predetermined undervoltage protection threshold values based on the control signal as received. The method further comprises outputting a signal indicating whether to activate an undervoltage protection based on a comparison between a switched undervoltage protection threshold value and a sampled voltage value from a high voltage side of the DC/DC converter. In the circumstance that the DC/DC converter operates in the buck mode, the undervoltage protection unit will activate the undervoltage protection such as to prevent a large current flowing from a low side voltage side to the high voltage side if the sampled voltage value is less than or equal to the switched undervoltage protection threshold value, and the DC/DC converter will continuously operate in the buck mode if the sampled voltage value is greater than the switched undervoltage protection threshold value.

In one embodiment, in the circumstance that the DC/DC converter operates in the first precharge stage, the outputted signal indicating the undervoltage status will be used as a start signal for a timeout fault timer to start timing, if the time that the undervoltage status takes is significantly longer than the time that the first precharge stage generally requires, an overtime fault will be reported and the first precharge stage will be suspended.

In one embodiment, in the circumstance that the DC/DC converter operates in the second precharge stage, the signal indicating to activate the undervoltage protection will be outputted if the sampled voltage value is less than or equal to the switched undervoltage protection threshold value, and the DC/DC converter will continuously operate in the second precharge stage if the sampled voltage value is greater than the switched undervoltage protection threshold value.

In one embodiment, the method further comprises providing the at least two predetermined undervoltage protection threshold values respectively in the first precharge stage, the second precharge stage and the buck model, the second precharge stage or the buck model will be suspended when activating the undervoltage protection.

In one embodiment, the method further comprises a first undervoltage protection threshold value will be switched when the DC/DC converter operates in the first and second precharge stages, a second undervoltage protection threshold value will be switched when the DC/DC converter operates in the buck model.

In one embodiment, a first undervoltage protection threshold value for the first and second precharge stages will be generated when an electric switch is turned on, a second undervoltage protection threshold value for the buck model will be generated when the electric switch is turned off.

In one embodiment, the first undervoltage protection threshold value for the first and second precharge stages will be generated when the electric switch is turned on, the second undervoltage protection threshold value for the buck model will be generated when the electric switch is turned off.

In one embodiment, the method further comprises receiving and comparing the sampled voltage value from the high voltage side and the switched undervoltage protection threshold value, and outputting the signal at a high or low level based on the result of the comparing so as to indicate whether to activate the undervoltage protection, it will be indicated to activate the undervoltage protection when outputting the signal at a low level.

BRIEF DESCRIPTION OF THE DRAWINGS

These and other features and aspects of the present disclosure will become better understood when the following detailed description is read with reference to the accompanying drawings in which like characters represent like parts throughout the drawings, wherein.

DETAILED DESCRIPTION OF THE EMBODIMENT

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The use of "comprising", "including" or "having" and variations thereof and equivalents thereof as well as additional items. The term "connected" is not restricted to mechanical connections or couplings, and can include electrical connections or couplings, whether direct or indirect. In addition, terms "real-time" refers to at least one of the time when the associated event occurs, the time when the predetermined data is measured and collected, the time when the data is processed, and the time when the system corresponds to the event and the environment. In the embodiments described in present disclosure, these times occur substantially instantaneously.

Figure 1:
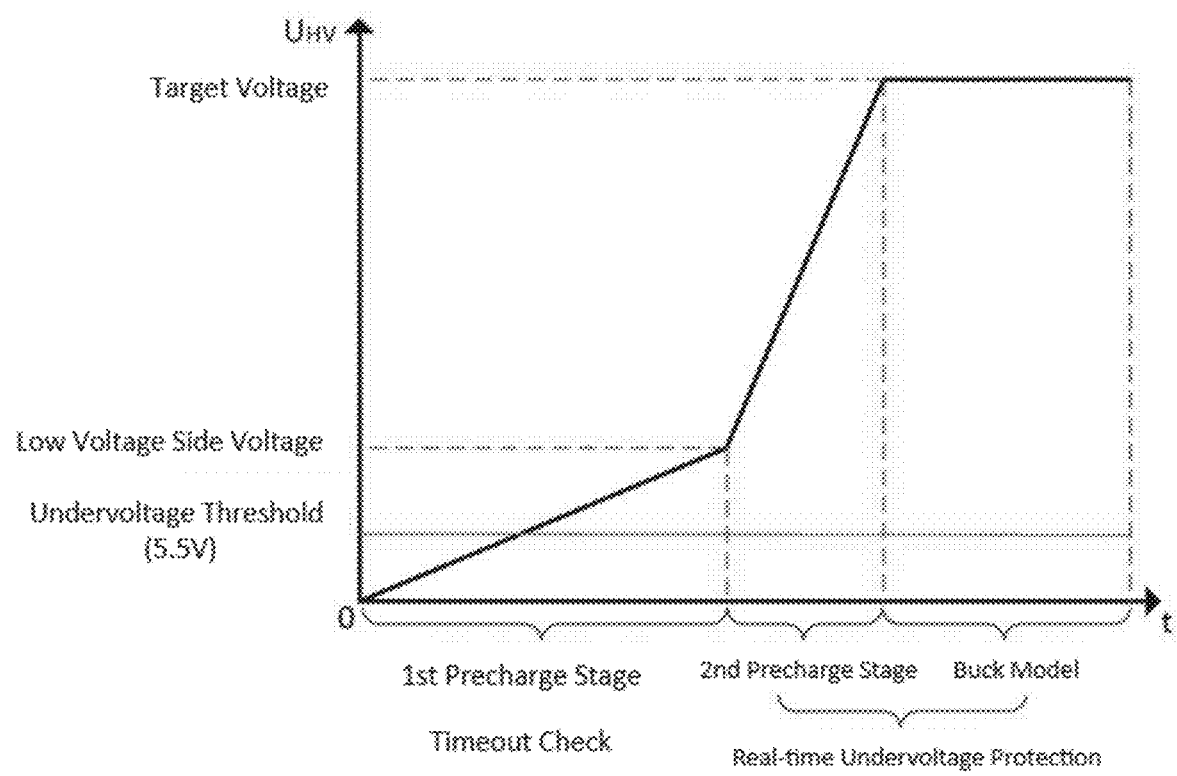
FIG. 1 is a diagram illustrating the working status of a 48V to 12V converter for an electrified vehicle with UVP according to the prior art.
Figure 2:
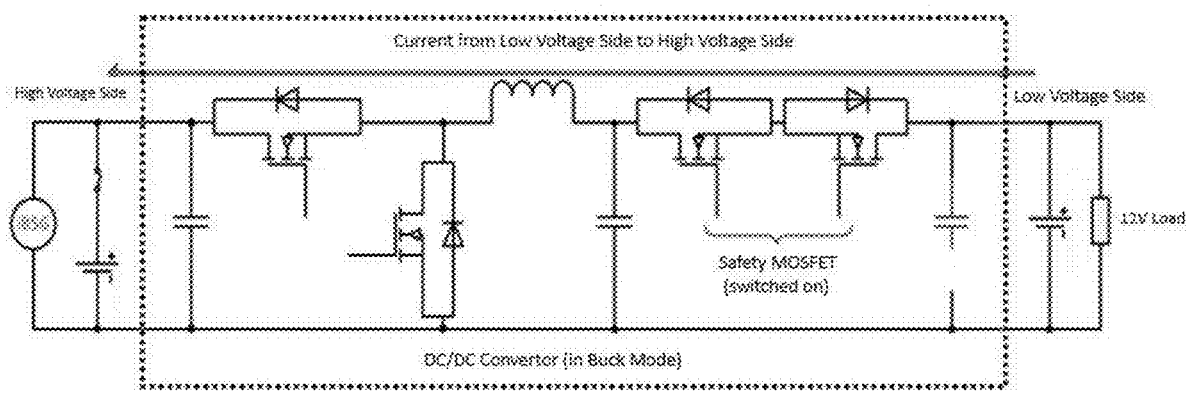
FIG. 2 is a diagram illustrating a large current flowing from LV side to HV side of a DC/DC converter with UVP in a buck mode according to the prior art.
Figure 3:
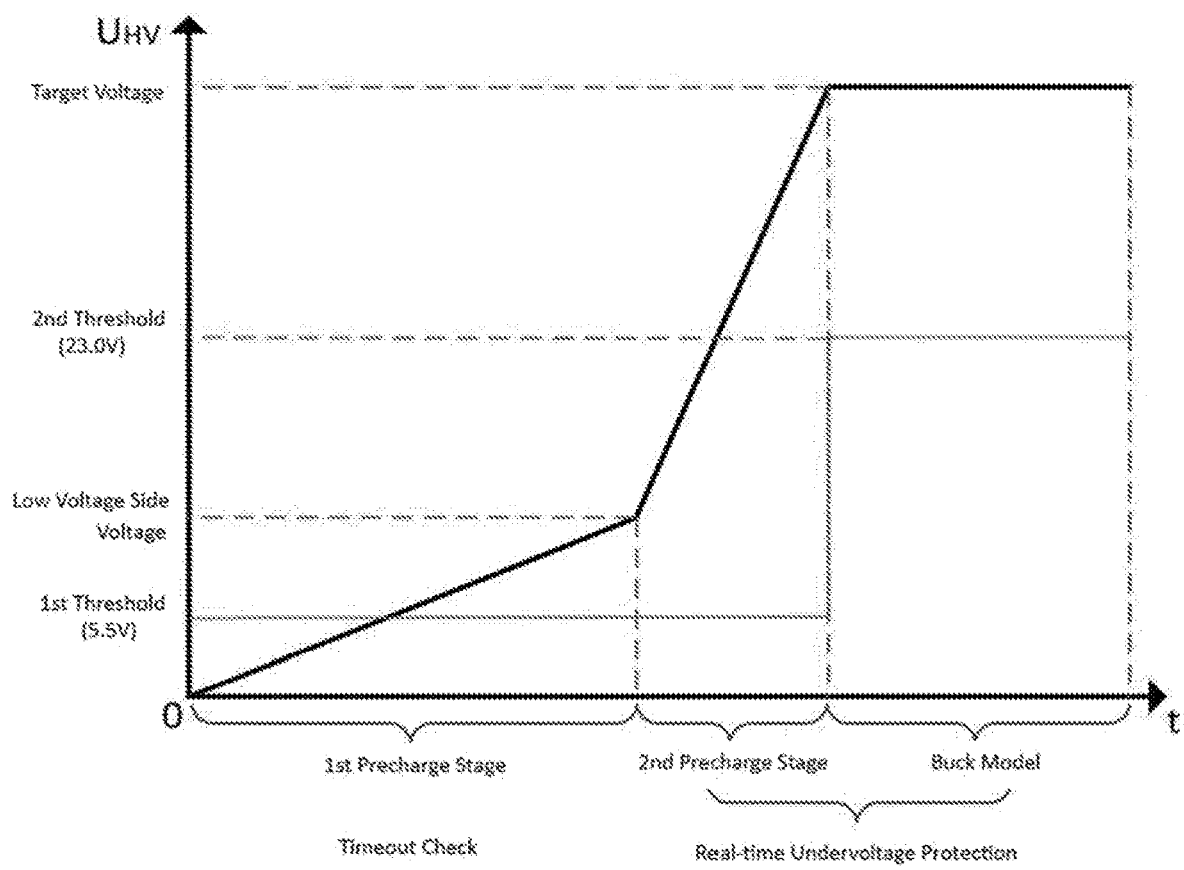
FIG. 3 is a diagram illustrating the working status according to one embodiment of the present disclosure.
Figure 4:
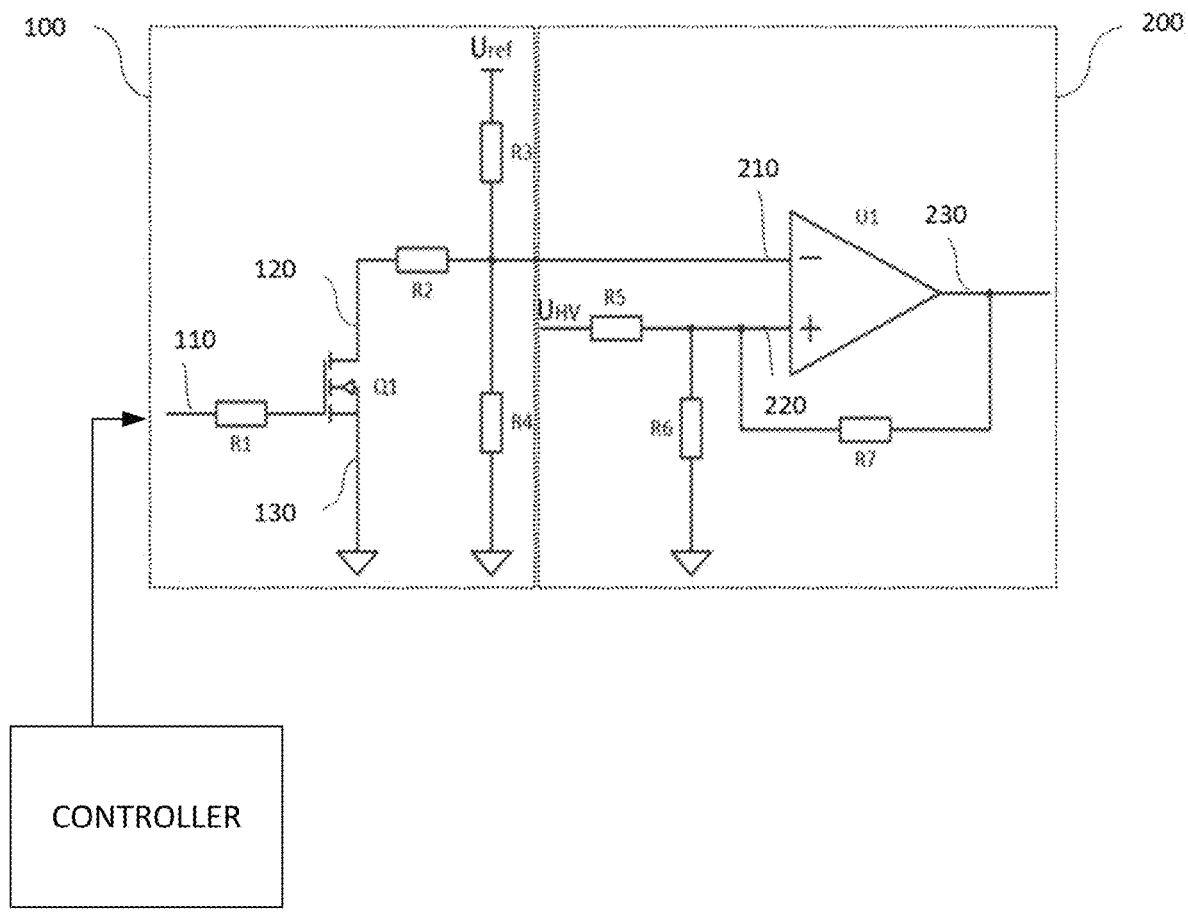
FIG. 4 is a UVP circuit diagram according to one embodiment of the present disclosure.
Figure 5:
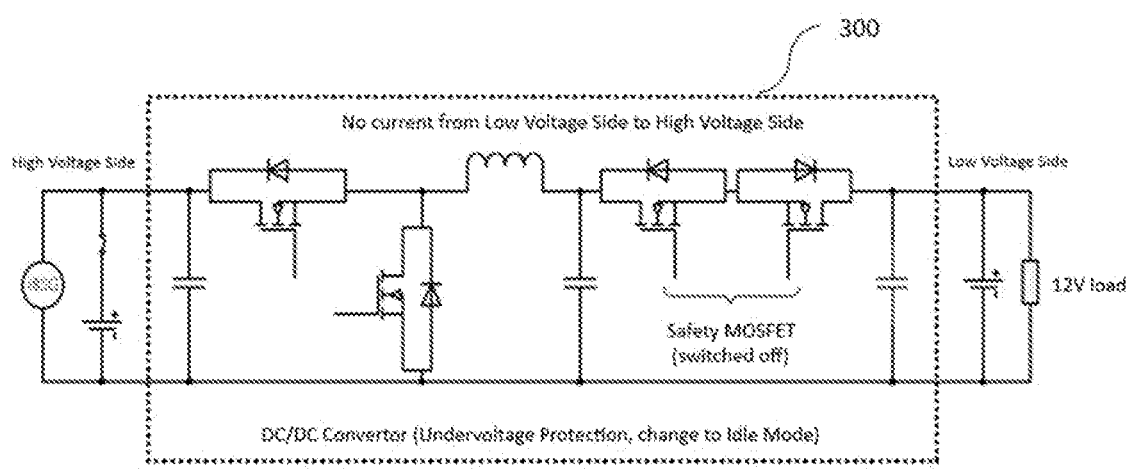
FIG. 5 is a diagram illustrating the absence of a large current flowing from LV side to HV side of a DC/DC converter with UVP in a buck mode according to one embodiment of the present disclosure.

FIGS. 3 to 6 illustrate UVP configurature, UVP circuit and UVP method during each operation stage/mode for a DC/DC converter according to the embodiment described in present disclosure, respectively. Specifically, DC/DC converter generally operates in a first pre-charge stage, a second pre-charge stage and a buck mode. Referring to FIG. 3, a first UVP threshold value is provided in the first and second pre-charge stages, such threshold value will be lower than 6.0V or approaching 6.0V, in one embodiment, the threshold can be 5.5V; Meanwhile, a second UVP threshold is provided in Buck mode, such threshold value will be lower than 24.0V or approaching 24.0V, in one embodiment, the threshold can be 23.0V. In the illustrated embodiment, during the first pre-charge stage, i.e., HV side voltage is charged from 0 to 12V battery voltage, UPV is a timeout protection, i.e., if the time that the undervoltage status takes is significantly longer than the time that the first pre-charge stage generally requires, an overtime fault will be reported and the first pre-charge stage will be suspended. After entering into the second pre-charge stage, HV side voltage will be charged from 12V battery voltage to a target voltage value (e.g., 48V), at this time, the UVP mechanism will work in real-time under a first predetermined UVP threshold value, if HV side voltage value drops below the first UVP threshold value, i.e., below 5.5V, UVP will be triggered, and the second pre-charge stage will be suspended the safety MOSFET within the DC/DC converter will be turned off. After entering into the high-power buck mode, HV side voltage value will be maintained at a target value (e.g., 48V), at this time, UVP mechanism will be work in real-time under a second predetermined UVP threshold value, if HV side voltage value drops below the second UVP threshold value, i.e., below 23.0V, UVP will be triggered, and the buck mode will be suspended the safety MOSFET within the DC/DC converter will be turned off. Referring to FIG. 5, DC/DC converter circuit 300 under UVP will switch to a idle mode, so that there will be no current flow from LV side to HV side, thereby avoiding the damage to the main circuit and safety MOSFETs which may be caused by large currents flowing from LV side to HV side, as well as assuring not much interference from UVP mechanism. In addition, the setting of a higher UVP threshold value under the buck mode is helpful for achieving a more sensitive and faster implementation of UVP, thereby giving a more efficiently protection for DC/DC converter.

It is to be understood that at least two predetermined UVP threshold value can be respectively set in the first pre-charge stage, the second pre-charge stage and the buck mode for DC/DC converter.

Referring to FIG. 4, in the illustrated embodiment, the UVP circuit may comprise a threshold value switching unit 100 and an undervoltage protection unit 200. The threshold value switching unit 100 includes an input terminal 110 configured for receiving control signals for switching among at least two predetermined UVP threshold values. In one embodiment, the control signals are from a controller which could be any type of programmable device, such as a MCU, a DSP (Digital Signal Processor). In the illustrated embodiment, the input terminal 110 can be connected to a controller (not shown) for receiving control signals for switching between the first and second UVP threshold values. When DC/DC converter works in the first and second pre-charge stages, the input terminal 110 receives control signals so that the threshold value switching unit 100 could switch to be the first UVP threshold value. When DC/DC converter works in buck mode, the input terminal 110 receives control signals so that the threshold value switching unit 100 could switch to be the second UVP threshold value.

In one embodiment, the threshold value switching unit 100 may comprise an electrical switch Q1. The switch can be, without limitation, IGBT, IGCT, MOSFET, IEGT, SiC-MOSFET, or any other controllable power switch which may be switched between switch-on and switch-off. In the illustrated embodiment, the electrical switch Q1 is a MOSFET which is connected with the input terminal 110 so as to receive control signals from the controller. Output terminals 120, 130 of the switch Q1 are respectively connected to the ground and a second voltage divider resistor R2. The threshold value switching unit 100 may further comprise a reference voltage terminal Uref whose voltage value is set to be the first UVP threshold value, such as 5.5V; the voltage value of the ground terminal is set to be the second UVP threshold value, such as 23.0V. Still referring to FIG. 4, the threshold value switching unit 100 may further comprise a third and fourth voltage divider resistors R3, R4, the third voltage divider resistor R3 is connected with the reference voltage terminal Uref, the fourth voltage divider resistor R3 is connected with the ground. A voltage divider circuit is comprised of these voltage divider resistors R2, R3 and R4 and is configured for determining the UVP threshold value.

In one embodiment, control signals received by the input terminal 110 includes signals at a high level and signal at a low level. When the control signals as received are the signals at a high level, the switch Q1 will be switch-on, then a second voltage divider resistor R2 and a fourth voltage divider resistor R4 are connected in parallel, the voltage value as outputted from the threshold value switching unit 100 is equal to the first UVP threshold value, e.g., 5.5V. When the control signals as received are the signals at a low level, the switch Q1 will be switch-off, the voltage value as outputted from the threshold value switching unit 100 will be equal to the second UVP threshold value, e.g., 23.0V.

Still referring to FIG. 4, the undervoltage protection unit 200 may include a comparator U1, one input terminal 210 of the comparator U1 is connected to a sampled voltage value $U_{HV}$ of HV side, the other input terminal 220 of the comparator U1 is connected to an outputting voltage value, i.e., the first or second UVP threshold value of the threshold value switching unit 100.

The comparator U1 may receive and compare the sampled voltage value $U_{HV}$ of HV side and the switched UVP threshold value, and output signals at a high/low level from the output terminal 230 based on the results of comparing so as to indicate whether to activate the UVP. When the sampled voltage value $U_{HV}$ is less than or equal to the switched undervoltage protection threshold value, the undervoltage protection unit 200 will output signals, e.g., at a low level, to indicate to activate the UVP; When the sampled voltage value $U_{HV}$ is greater than the switched undervoltage protection threshold value, the undervoltage protection unit 200 will output signals, e.g., at a high level, DC/DC converter will continuously operate in the second pre-charge stage.

Specifically, in the circumstance that DC/DC converter operates in the first pre-charge stage, the outputted signal indicating the undervoltage status will be used as a start signal for a timeout fault timer to start timing, if the time that the undervoltage status takes is significantly longer than the time that the first precharge stage generally requires, an overtime fault will be reported and the first precharge stage will be suspended.

In the circumstance that the DC/DC converter operates in the second precharge stage, the threshold value switching unit 100 will still output the second UVP threshold value, e.g., 23.0V, to one input terminal 210 of the comparator U1, at this time, the other input terminal 220 will receive the sampled voltage value $U_{HV}$ of HV side in real-time. If the sampled voltage value $U_{HV}$ is less than or equal to the first UVP threshold value, DC/DC converter will stop working in the second pre-charge stage. If the sampled voltage value $U_{HV}$ is greater than the first UVP threshold value, DC/DC converter will continuously work in the second precharge stage.

In the circumstance that the DC/DC converter operates in buck mode, the threshold value switching unit 100 will output the second UVP threshold value, e.g., 23.0V, to one input terminal 210 of the comparator U1, at this time, the other input terminal 220 will receive the sampled voltage value $U_{HV}$ of HV side in real-time. If the sampled voltage value $U_{HV}$ is less than or equal to the second UVP threshold value, DC/DC converter will stop working in buck mode. If the sampled voltage value $U_{HV}$ is greater than the second UVP threshold value, DC/DC converter will continuously work in buck mode. The fifth and sixth voltage dividing resistors R5, R6 divide the sampled voltage value $U_{HV}$ into a relatively lower voltage according a certain ratio, such lower voltage will be compared with the voltage outputted from the threshold value switching unit 100, i.e., from one input terminal 210 of the comparator U1.

Still referring to FIG. 4, the undervoltage protection unit 200 may comprise a resistor R7 that is used to provide a hysteresis to make the protection circuit have Schmitt characteristics. The resistor R7 is connected to the other input 220 and the output 230 of the comparator U1 to prevent the undervoltage protection unit 200 from circuit oscillates when the sampled voltage value $U_{HV}$ is near the undervoltage protection threshold value, thereby improving the stability of the voltage protection unit circuit.

Figure 6:
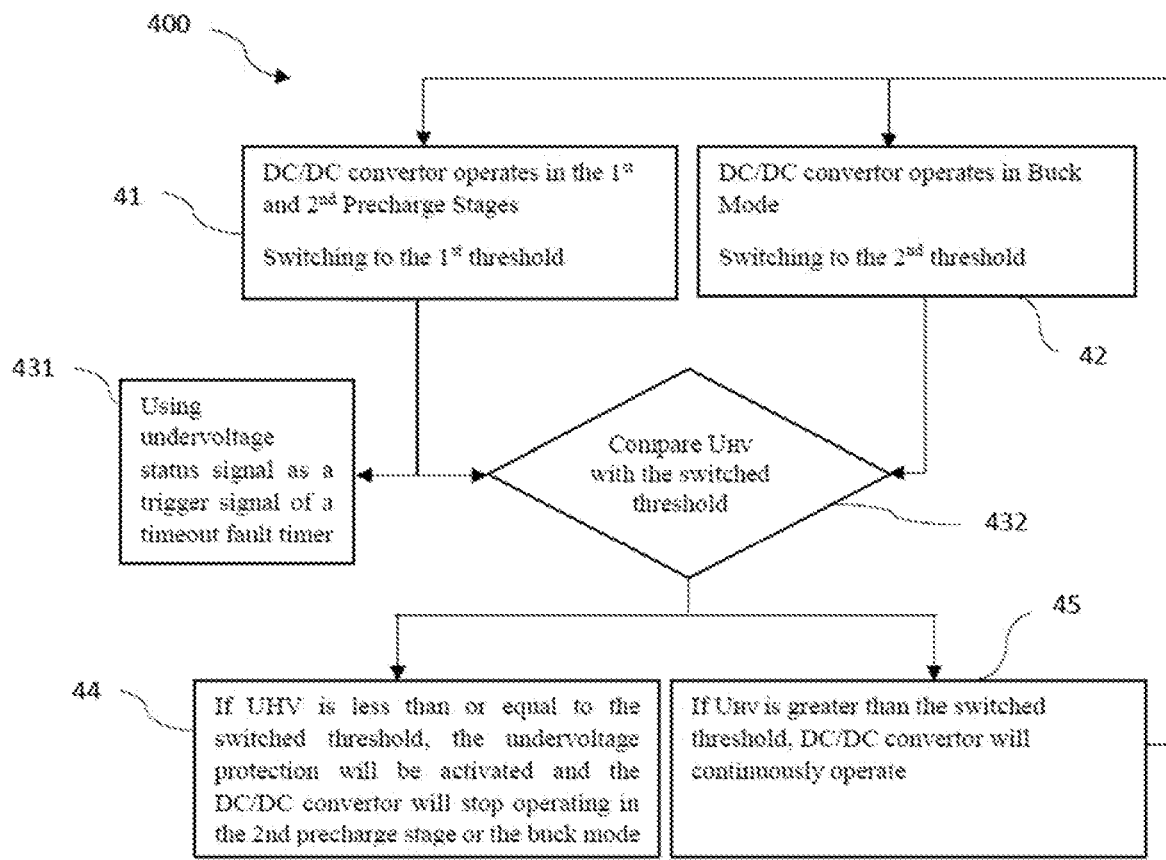
FIG. 6 is a flow diagram of a process for UVP according to one embodiment of the present disclosure.

FIG. 6 illustrated a UVP method 400 applied to the UVP mechanism as shown in FIGS. 3 to 5. The method may comprise the following steps:

In step 41 and step 42, the process continues to provide a controller to output related control signals according to the different modes of DC/DC converter, and provide a threshold switching unit to receive control signals. When DC/DC converter works in the first and second pre-charge stages, the threshold switching unit will switch to the first threshold; When DC/DC converter works in buck mode, the threshold switching unit will switch to the second threshold.

In step 431 and step 432, the process continues to provide the undervoltage protection unit. In the circumstance that DC/DC converter operates in the first pre-charge stage, the signal indicating the undervoltage status outputted from the undervoltage protection unit will be used as a start signal for a timeout fault timer to start timing. In the circumstance that DC/DC converter operates in the second pre-charge stage or in buck mode, the undervoltage protection unit will compare the sampled voltage value of HV side and the switched UVP threshold value.

In step 44, if the sampled voltage value is less than or equal to the switched UVP threshold, the undervoltage protection will be activated so as to avoid large current to flow from LV side to HV side of DC/DC converter.

In step 45, if the sampled voltage value is greater than the switched UVP threshold, HV side of DC/DC convertor will continuously work in the second precharge stage or the buck mode.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

The invention claimed is:

1. An undervoltage protection circuit for a DC/DC converter of an electrified vehicle, the DC/DC converter operating in a first precharge stage, a second precharge stage and a buck model, the undervoltage protection circuit comprising:
    a threshold value switching unit connected with a controller and configured for receiving a control signal from the controller and switching among at least two predetermined undervoltage protection threshold values to generate a switched undervoltage protection threshold value based on the control signal as received; and
    an undervoltage protection unit configured for outputting a signal indicating whether to activate an undervoltage protection based on a comparison between the switched undervoltage protection threshold value and a sampled voltage value from a high voltage side of the DC/DC converter;
    wherein
    a first predetermined undervoltage protection threshold value of the at least two predetermined undervoltage protection threshold values is associated with at least the first precharge stage or the second precharge stage,
    a second predetermined undervoltage protection threshold value of the at least two predetermined undervoltage protection threshold values is associated with the buck model and is greater than the first predetermined undervoltage protection threshold value and less than a target high voltage of the DC/DC converter,
    in the circumstance that the DC/DC converter operates in the buck model, the undervoltage protection unit will activate the undervoltage protection such as to prevent or reduce a current flowing from a low side voltage side to the high voltage side if the sampled voltage value is less than or equal to the switched undervoltage protection threshold value and the DC/DC converter will continuously operate in the buck model if the sampled voltage value is greater than the switched undervoltage protection threshold value, and
    when the DC/DC converter operates in the first and second precharge stages, the first undervoltage protection threshold value will be switched by the threshold value switching unit, and when the DC/DC converter operates in the buck model, the second undervoltage protection threshold value will be switched by the threshold value switching unit.

2. The undervoltage protection circuit according to claim 1, wherein
    in the circumstance that the DC/DC converter operates in the first precharge stage, the signal indicating an undervoltage status as outputted by the undervoltage protection circuit will be used as a start signal for a timeout fault timer to start timing.

3. The undervoltage protection circuit according to claim 1, wherein
in the circumstance that the DC/DC converter operates in the second precharge stage, the undervoltage protection unit will activate the undervoltage protection if the sampled voltage value is less than or equal to the switched undervoltage protection threshold value, and the DC/DC converter will continuously operate in the second precharge stage if the sampled voltage value is greater than the switched undervoltage protection threshold value.

4. The undervoltage protection circuit according to claim 1, wherein
the second precharge stage or the buck model will be suspended when activating the undervoltage protection.

5. The undervoltage protection circuit according to claim 1, wherein
the threshold value switching unit comprises an electric switch, the first undervoltage protection threshold value will be generated when the electric switch is turned on, and the second undervoltage protection threshold value for the buck model will be generated when the electric switch is turned off.

6. The undervoltage protection circuit according to claim 5, wherein
the control signal received by the threshold value switching unit from the controller includes the control signal at a high level or the control signal at a low level, and the electric switch will be turned off when the control signal is at the low level, the electric switch will be turned on when the control signal is at the high level.

7. The undervoltage protection circuit according to claim 1, wherein
the undervoltage protection unit comprises a comparing device configured for receiving and comparing the sampled voltage value from the high voltage side and the switched undervoltage protection threshold value, and for outputting the signal at a high or low level based on the result of the comparing so as to indicate whether to activate the undervoltage protection, and the signal having the low level indicates activation of the undervoltage protection.

8. A method of undervoltage protection for a DC/DC converter of an electrified vehicle, the DC/DC converter operating in a first precharge stage, a second precharge stage and a buck model, the method of undervoltage protection comprising:
receiving a control signal from a controller and switching among at least two predetermined undervoltage protection threshold values based on the control signal as received to generate a switched undervoltage protection threshold value; and
outputting a signal indicating whether to activate an undervoltage protection based on a comparison between the switched undervoltage protection threshold value and a sampled voltage value from a high voltage side of the DC/DC converter;
wherein
a first predetermined undervoltage protection threshold value of the at least two predetermined undervoltage protection threshold values is associated with at least the first precharge stage or the second precharge stage,
a second predetermined undervoltage protection threshold value of the at least two predetermined undervoltage protection threshold values is associated with the buck model and is greater than the first predetermined undervoltage protection threshold value and less than a target high voltage of the DC/DC converter,
in the circumstance that the DC/DC converter operates in the buck model, the undervoltage protection unit will activate the undervoltage protection such as to prevent or reduce a current flowing from a low side voltage side to the high voltage side if the sampled voltage value is less than or equal to the switched undervoltage protection threshold value, and the DC/DC converter will continuously operate in the buck model if the sampled voltage value is greater than the switched undervoltage protection threshold value, and
the first undervoltage protection threshold value will be switched when the DC/DC converter operates in the first and second precharge stages, and the second undervoltage protection threshold value will be switched when the DC/DC converter operates in the buck model.

9. The method according to claim 8, further comprising:
in the circumstance that the DC/DC converter operates in the first precharge stage, the signal indicating an undervoltage status will be used as a start signal for a timeout fault timer to start timing, and if a time that the undervoltage status takes is significantly longer than a required time of the first precharge stage, an overtime fault will be reported and the first precharge stage will be suspended;
in the circumstance that the DC/DC converter operates in the second precharge stage, the signal indicating to activate the undervoltage protection will be outputted if the sampled voltage value is less than or equal to the switched undervoltage protection threshold value, and the DC/DC converter will continuously operate in the second precharge stage if the sampled voltage value is greater than the switched undervoltage protection threshold value.

10. The method according to claim 8, wherein
the second precharge stage or the buck model will be suspended when activating the undervoltage protection.

11. The method according to claim 8, wherein
the first undervoltage protection threshold value for the first and second precharge stages will be generated when an electric switch is turned on, and the second undervoltage protection threshold value for the buck model will be generated when the electric switch is turned off.

12. The method according to claim 10, wherein
the first undervoltage protection threshold value for the first and second precharge stages will be generated when the electric switch is turned on, the second undervoltage protection threshold value for the buck model will be generated when the electric switch is turned off.

13. The method according to claim 8, further comprising
receiving and comparing the sampled voltage value from the high voltage side and the switched undervoltage protection threshold value, and
outputting the signal at a high or low level based on the result of the comparing so as to indicate whether to activate the undervoltage protection, wherein the signal having the low level indicates activation of the undervoltage protection.

* * * * *